United States Patent [19]
Yoshida et al.

[11] Patent Number: 4,967,284
[45] Date of Patent: Oct. 30, 1990

[54] IMAGE FORMING APPARATUS AND METHOD OF CONTROLLING OUTPUT OF SEMICONDUCTOR LASER

[75] Inventors: Yoshiki Yoshida, Yokohama; Kenichirou Asada, Tokyo; Kiyoto Nagasawa, Yokohama, all of Japan

[73] Assignee: Ricoh Company, Ltd., Tokyo, Japan

[21] Appl. No.: 258,599

[22] Filed: Oct. 17, 1988

[30] Foreign Application Priority Data

| Oct. 19, 1987 | [JP] | Japan | 62-261656 |
| Oct. 30, 1987 | [JP] | Japan | 62-274791 |
| Oct. 30, 1987 | [JP] | Japan | 62-274792 |
| Nov. 6, 1987 | [JP] | Japan | 62-279327 |
| Aug. 24, 1988 | [JP] | Japan | 63-208032 |

[51] Int. Cl.$^5$ ............ G01D 15/16; H04N 1/21
[52] U.S. Cl. .................... 358/300; 346/108
[58] Field of Search ........... 346/108, 107 R, 76 L, 346/160, 1.1; 358/296, 300, 302

[56] References Cited

U.S. PATENT DOCUMENTS

| 4,375,067 | 2/1983 | Kitamura | 346/160 |
| 4,443,097 | 4/1984 | Nagasawa et al. | |
| 4,725,854 | 2/1988 | Ohtsuka | 346/160 |

FOREIGN PATENT DOCUMENTS

109371 6/1986 Japan .

*Primary Examiner*—Mark J. Reinhart
*Attorney, Agent, or Firm*—Cooper & Dunham

[57] ABSTRACT

An image forming apparatus has a control device for controlling an optical output of a semiconductor laser. An operation of controlling the optical output is started with a timing before an incoming signal which indicates an effective image region in a sub scanning direction of a photosensitive body and responsive to a timing signal (or power check start signal) having a predetermined period.

16 Claims, 16 Drawing Sheets

(A) CGATE
(B) FGATE
(C) LSYNC
(D) PCHK (A) CGATE
(B) FGATE
(C) OSC2
(D) PCHK2
(E) OSC 3
(F) PCHK

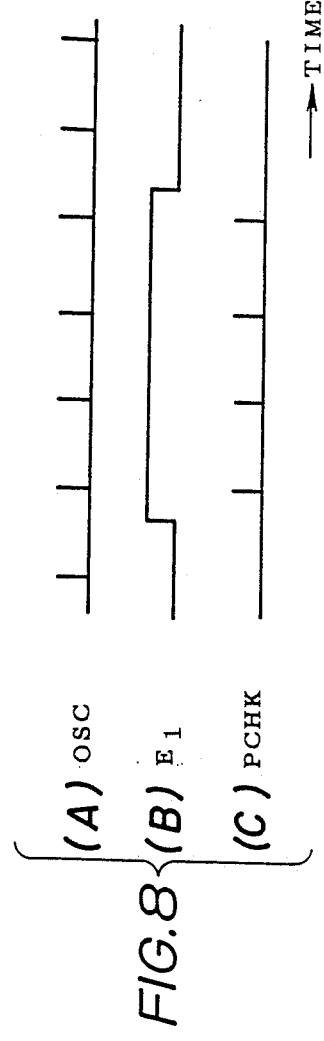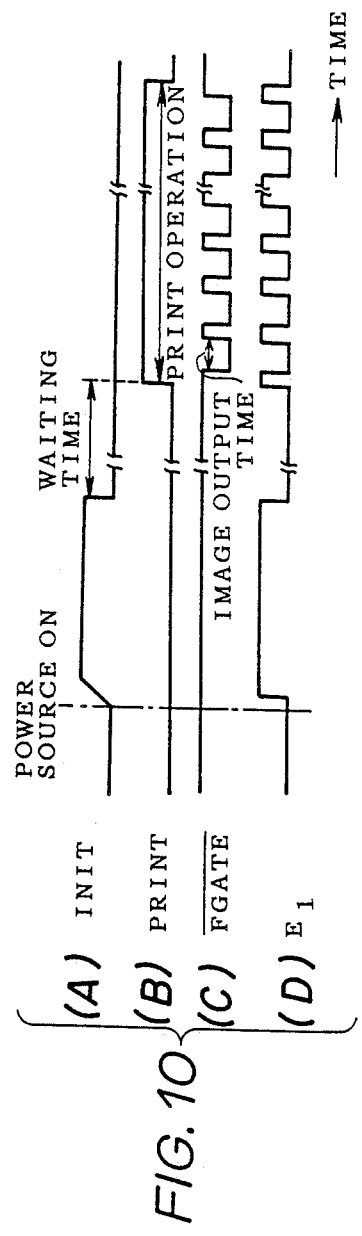

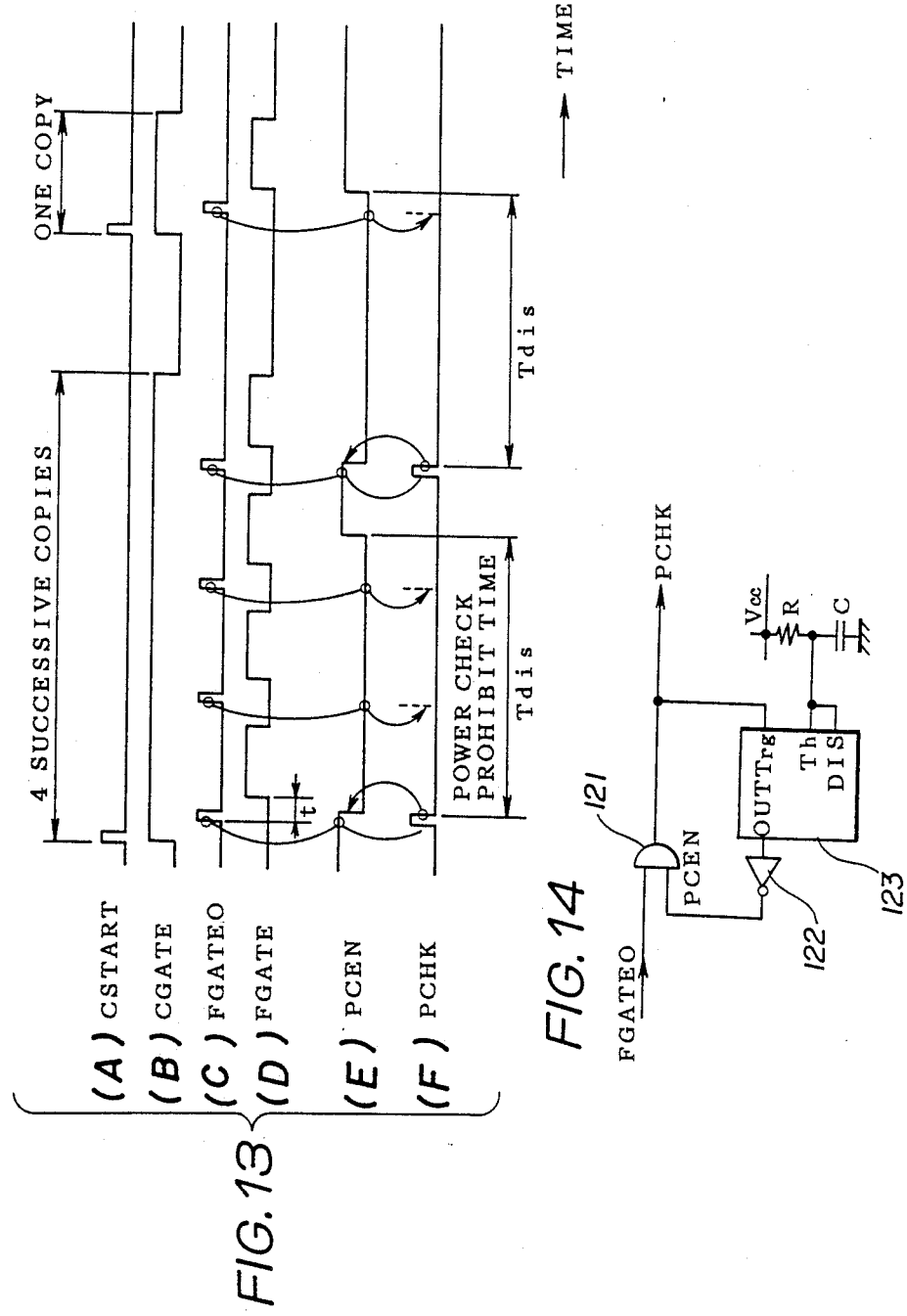

IMAGE FORMING APPARATUS AND METHOD OF CONTROLLING OUTPUT OF SEMICONDUCTOR LASER

BACKGROUND OF THE INVENTION

The present invention generally relates to image forming apparatuses and methods of controlling an output of a semiconductor laser of the image forming apparatus, and more particularly to an image forming apparatus such as a digital copying machine, a laser printer and a facsimile machine which forms an image by use of a semiconductor laser beam and a method of controlling the output of the semiconductor laser of such an image forming apparatus.

Generally, an image forming apparatus such as a laser beam printer is provided with a photodetector for detecting a laser power (optical output) of a semiconductor laser, and a current injected to the semiconductor laser from a constant current source is variably controlled responsive to an output signal of the photodetector so as to control a power of the laser beam constant. The construction of the photodetector may be simplified by use of a photodiode provided within a semiconductor laser package.

In the present specification, an operation of controlling the power of the laser beam constant by variably controlling the current injected to the semiconductor laser depending on the output signal of the photodetector will be referred to as a "power check".

Generally, the power check is carried out by turning ON the semiconductor laser for a certain short and constant time when no image formation takes place. This certain short and constant time differs depending on the image forming apparatus. In other words, the power check is carried out during a time corresponding to a no-image region in each main scanning line or during a time corresponding to a region outside an image region between two successive image formations.

However, depending on the circuit construction, response speed and the like of a feedback control system which detects the laser power of the semiconductor laser and controls the power of the laser beam constant responsive to the detected laser power, the semiconductor laser may remain turned ON for the power check even after the scanning of a photosensitive body starts. In addition, the semiconductor laser may remain turned ON for the power check even after the scanning of the photosensitive body starts also depending on an effective scan time ratio of an optical system between a time in which the image region is scanned and a time in which one line is scanned. Especially in the case where the power check is carried out responsive to a timing signal which is generated at constant intervals and a supply of the timing signal to the feedback control system is permitted when the power check takes place outside the image region, the power check is carried out in a waiting mode in which the photosensitive body is stationary and no image formation takes place with a frequency identical to a frequency with which the power check is carried out in an image formation mode in which the image formation takes place. For example, the image formation mode corresponds to a copy mode in the case of a copying apparatus and corresponds to a print mode in the case of a printer. But when the power check is carried out while the photosensitive body is stationary, the laser beam continuously hits the same portion on the photosensitive body and this portion of the photosensitive body becomes deteriorated. As a result, the picture quality of the image formed in the image forming apparatus becomes deteriorated due to the deteriorated portion of the photosensitive body, and such a deterioration in the picture quality is observed as a white line or a black line depending on a developing system employed in the image forming apparatus. It is highly desirable to prevent such a deterioration in the picture quality because one of the outstanding features of the image forming apparatus such as the laser printer is the extremely fine picture quality that is obtainable due to the use of the semiconductor laser.

Next, a description will be given of a conventional image forming apparatus which carries out the power check for every main scanning line. In such an image forming apparatus, a line synchronizing signal and an image region signal are successively outputted for every line, and the power check is carried out before each line synchronizing signal is outputted. The image region signal indicates a region in which the image exists. But when an attempt is made to form an image having a high picture quality at a high speed, a duration of one line (that is, an interval with which the line synchronizing signals are outputted) becomes short and it becomes necessary to set a frame frequency to a high frequency. In order to avoid setting the frame frequency to the high frequency, a lens and a deflector of the image forming apparatus must be designed to set the scan time ratio to a large value, however, this would make a time in which the power check is carried out within one line scanning period extremely short. In actual practice, it is virtually impossible to control with a high accuracy the optical output of the semiconductor laser within such an extremely short time.

Therefore, there is a demand for an image forming apparatus which forms an image having a high picture quality and positively carries out a power check which guarantees the high picture quality of the formed image.

SUMMARY OF THE INVENTION

Accordingly, it is a general object of the present invention to provide a novel and useful image forming apparatus in which the problems described above are eliminated.

Another and more specific object of the present invention is to provide an image forming apparatus in which an operation of controlling an optical output of a semiconductor laser is started with mutually different timings at an image forming portion of a photosensitive body and a no-image forming portion of the photosensitive body. According to the image forming apparatus of the present invention, it is possible to prevent a laser beam from being irradiated on a specific portion of the photosensitive body and thus prevent the specific portion of the photosensitive body from becoming deteriorated.

Still another object of the present invention is to provide an image forming apparatus in which an operation of controlling an optical output of a semiconductor laser is started with a timing before an incoming signal which indicates an effective image region in a sub scanning direction of a photosensitive body and responsive to a timing signal (or power check start signal) having a predetermined period. According to the image forming apparatus of the present invention, the control operation (power check) will not be carried out when the photosensitive body is stationary. In addition, compared to the apparatus which carries out the control operation for each line, it is possible to guarantee a sufficiently long time for the control operation even when the apparatus operates at a high speed. In addition, it is possible to prevent inconsistencies in the picture quality of the formed images, and the images can be formed with a satisfactory reproducibility.

A further object of the present invention is to provide an image forming apparatus in which an operation of controlling an optical output of a semiconductor laser is started with a timing before an incoming signal which indicates an effective image region in a sub scanning direction of a photosensitive body and only after a predetermined time has elapsed from a previous control operation. According to the image forming apparatus of the present invention, it is possible to prohibit the control operation depending on the time which has elapsed from the previous control operation and hence effectively reduce the number of times the control operation needs to be carried out.

Another object of the present invention is to provide an image forming apparatus in which an operation of controlling an optical output of a semiconductor laser is started with a timing before an incoming signal which indicates an effective image region in a sub scanning direction of a photosensitive body and responsive to a timing signal (or power check start signal) having a variable period. According to the image forming apparatus of the present invention, it is possible to carry out the control operation depending on the required control accuracy, the temperature change and the like of the semiconductor laser. Thus, the load on the semiconductor laser is effectively reduced, and the number of times the control operation needs to be carried out is minimized.

Still another object of the present invention is to provide a method of controlling an optical output of a semiconductor laser provided in an image forming apparatus, wherein an operation of controlling an optical output of a semiconductor laser is started with a timing before an incoming signal which indicates an effective image region in a sub scanning direction of a photosensitive body and responsive to a timing signal (or power check start signal) having a predetermined period. The predetermined period of the timing signal may be variable.

Other objects and further features of the present invention will be apparent from the following detailed description when read in conjunction with the accompanying drawings.

BRIEF DESCRIPTION OF THE DRAWINGS

FIGS. 8(A) through 8(C) are timing charts for explaining an operation of the timer shown in FIG. 7;

FIGS. 10(A) through 10(D) are timing charts for explaining an operation of the power check enable signal generating circuit shown in FIG. 9;

FIGS. 13(A) through 13(F) are time charts for explaining an operation of a fourth embodiment of the image forming apparatus according to the present invention;

FIG. 14 is a circuit diagram showing an embodiment of a timing signal generating circuit of the fourth embodiment;

DETAILED DESCRIPTION

Figure 1:
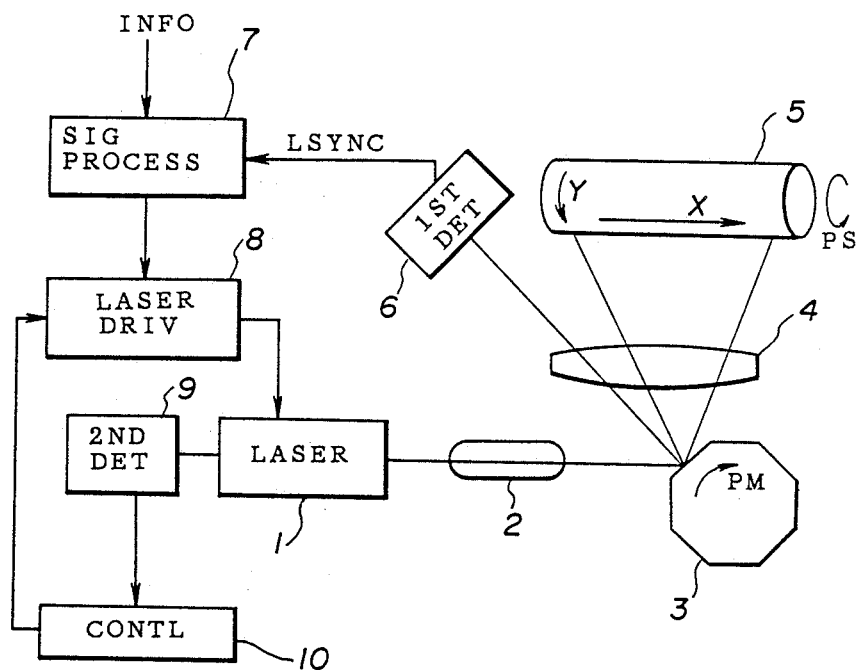
FIG. 1 is a system block diagram showing a first embodiment of an image forming apparatus according to the present invention.

First, a description will be given of a first embodiment of an image forming apparatus according to the present invention, by referring to FIG. 1. In FIG. 1, a laser beam emitted from a semiconductor laser 1 to a front thereof is supplied to a collimator lens 2 and a light beam from the collimator lens 2 is directed to an optical scanning device having a polygonal mirror 3. The polygonal mirror 3 deflects the light beam from the collimator lens 2 and images the light beam on a charged surface of a photosensitive body 5 through an fθ lens 4. In this embodiment, the photosensitive body 5 has a form of a rotatable photosensitive drum. A spot formed by the imaging repeatedly moves in a main scanning direction X as the polygonal mirror 3 rotates in a direction PM while the spot also scans in a sub scanning direction Y as the photosensitive body 5 rotates in a direction PS.

A first photodetector 6 is provided outside an information write region along an axial direction of the photosensitive body 5. For example, the first photodetector 6 detects a laser beam deflected by the polygonal mirror 3 and generates a line synchronizing signal LSYNC responsive to the detected laser beam. The line synchronizing signal LSYNC indicates a position where the write operation starts on each line. A signal processing circuit 7 supplies an incoming information signal (video data) INFO to a laser driving circuit 8 with a timing controlled by the line synchronizing signal LSYNC from the first photodetector 6.

The laser driving circuit 8 drives the semiconductor laser 1 depending on the information signal INFO from the signal processing circuit 7, and a laser beam modulated by the information signal INFO is emitted from the semiconductor laser 1 thereby forming a corresponding electrostatic image on the surface of the photosensitive body 5. The electrostatic image is developed in a known developing unit (not shown) and is transferred onto a recording sheet such as paper in a known image transfer unit (not shown).

A laser beam which is emitted from the semiconductor laser 1 to a rear thereof is detected by a second photodetector 9 which outputs a signal dependent on an intensity of the laser beam. A control circuit 10 controls the laser driving circuit 8 responsive to the output signal of the second photodetector 9 so that a quantity of light outputted from the semiconductor laser 1 becomes constant.

In this embodiment, the laser beam emitted to the rear of the semiconductor laser 1 is detected by the second photodetector 9 so as to detect the intensity of the laser beam. Hence, the second photodetector 9 may be sealed within a package of the semiconductor laser 1. In this case, unlike in a system which directs a portion of the laser beam emitted to the front of the semiconductor laser 1 to the second photodetector 9, there is no decrease in the intensity of the laser beam which is actually used to write the information on the photosensitive body 5.

Figure 2:
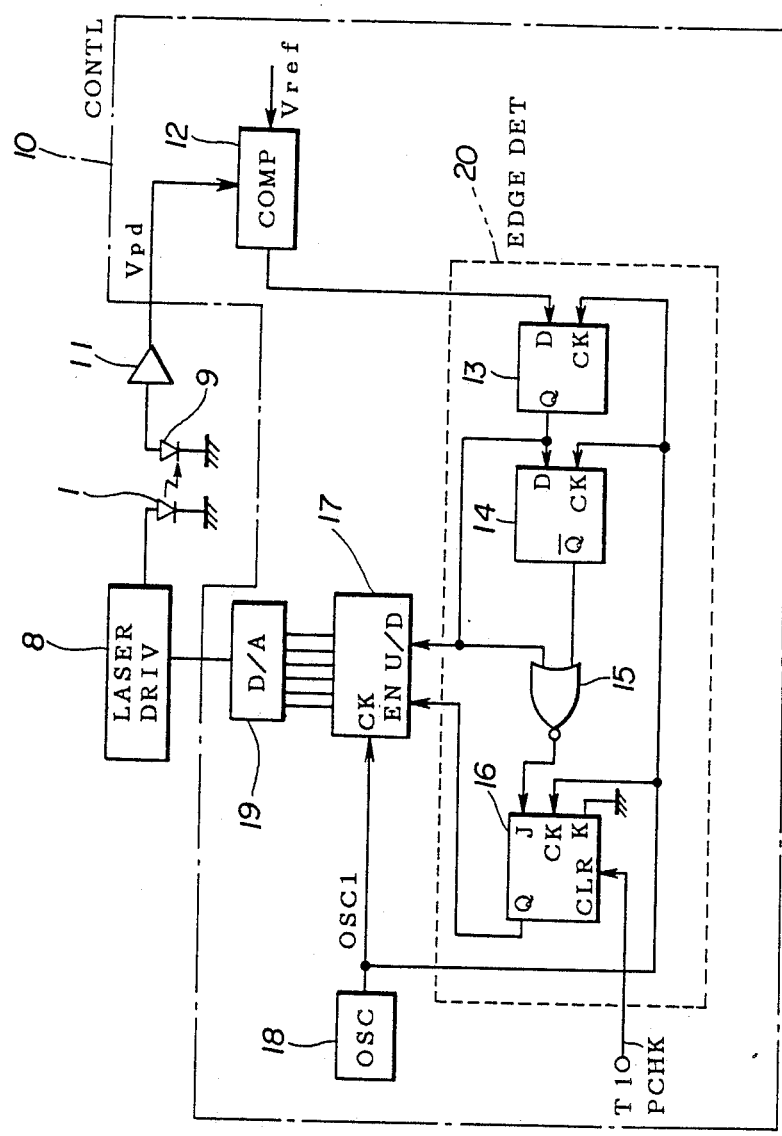
FIG. 2 is a system block diagram showing an embodiment of a control device of the first embodiment.

FIG. 2 shows an embodiment of a control device constituted by the laser driving circuit 8 and the control circuit 10. A control means using a counter and a digital-to-analog (D/A) converter is disclosed in Japanese Laid-Open patent applications No. 60-171863, No. 61-174786 and No. 61-174787, for example.

In FIG. 2, the control circuit 10 has a comparator 12, D flip-flops 13 and 14, a NOR circuit 15, a J-K flip-flop 16, an up-down counter 17, an oscillator 18, and a D/A converter 19. The flip-flop 16 is cleared when a timing signal PCHK for starting the power check (laser output control operation) is applied to a clear terminal CLK of the flip-flop 16 through a terminal T1. As a result, a low-level signal is outputted from a terminal Q of the flip-flop 16 and is supplied to an enable terminal EN of the up-down counter 17, and a counting operation of the up-down counter 17 is enabled thereby. An output clock signal OSC1 of the oscillator 18 is supplied to clock terminals CK of the flip-flops 13, 14 and 16, and the up-down counter 17. Hence, an output signal of the comparator 12 is latched by the flip-flop 13 responsive to the output clock signal OSC1 of the oscillator 18. An output signal from a terminal Q of the flip-flop 13 is supplied to a terminal U/D of the up-down counter 17 as a counting mode signal so as to control a counting mode thereof. At the same time, the output signal from the terminal Q of the flip-flop 13 is latched by the flip-flop 14 responsive to the output clock signal OSC1 of the oscillator 18. An output signal from a terminal $\overline{Q}$ of the flip-flop 14 and the output signal from the terminal Q of the flip-flop 13 are supplied to the NOR circuit 15, and an output signal of the NOR circuit 15 is supplied to a terminal J of the flip-flop 16 to set the flip-flop 16.

The amplifier 11 amplifies the output signal of the second photodetector 9 to a voltage Vpd which is proportional to the intensity of the laser beam detected by the second photodetector 9. The voltage Vpd is compared with a reference voltage Vref in the comparator 12. A low-level signal is outputted from the comparator 12 when the voltage Vpd is smaller than the reference voltage Vref, and a high-level signal is outputted form the comparator 12 when the voltage Vpd is greater than or equal to the reference voltage Vref.

When the comparator 12 outputs a high-level signal (that is, the voltage Vpd is greater than or equal to the reference voltage Vref) and the counting operation of the up-down counter 17 is enabled responsive to the timing signal PCHK, the up-down counter 17 operates as a down-counter responsive to a high-level signal from the flip-flop 13. An output of the up-down counter 17 is converted into an analog signal in the D/A converter 19 and is supplied to the laser driving circuit 8 which variably controls the current supplied to the semiconductor laser 1 depending on the analog signal from the D/A converter 19. In this case, the driving current supplied to the semiconductor laser 1 decreases and the output voltage of the amplifier 11 accordingly decreases.

When the output signal of the comparator 12 is inverted from the high level to the low level, a low-level signal is outputted from the flip-flop 13 and a high-level signal is outputted from the NOR circuit 15. As a result, the flip-flop 16 is set and the counting operation of the up-down counter 17 is prohibited.

When the comparator 12 outputs the low-level signal (that is, the voltage Vpd is smaller than the reference voltage Vref) and the counting operation of the up-down counter 17 is enabled responsive to the timing signal PCHK, the up-down counter 17 operates as an up-counter responsive to a low-level signal from the flip-flop 13. The output of the up-down counter 17 is converted into the analog signal in the D/A converter 19 and is supplied to the laser driving circuit 8 which variably controls the current supplied to the semiconductor laser 1 depending on the analog signal from the D/A converter 19. In this case, the driving current supplied to the semiconductor laser 1 increases and output voltage of the amplifier 11 accordingly increases.

Figure 3A:
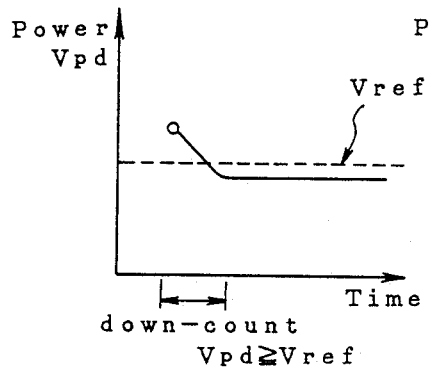
FIGS. 3A through 3C respectively show a stable output states of a semiconductor laser of the first embodiment.
Figure 3B:
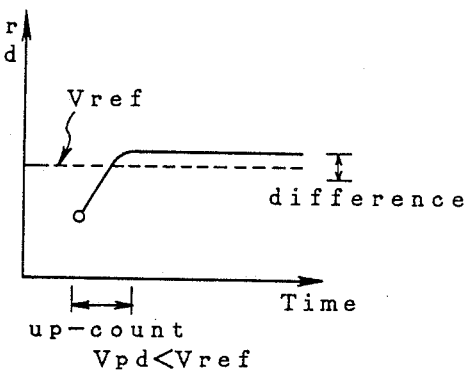

By stopping the counting operation at a time when the output signal of the comparator 12 is inverted from the high level to the low level, the power of the laser beam is held to such a value that the voltage Vpd is slightly lower than the reference voltage Vref as shown in FIG. 3A. On the other hand, when the counting operation is stopped at a time when the output signal of the comparator 12 is inverted from the low level to the high level, the power of the laser beam is held to such a value that the voltage Vpd is slightly higher than the reference voltage Vref as shown in FIG. 3B. In other words, when the counting operation is stopped at a time when the size relationship between the voltage Vpd and the reference voltage Vref reverses, the voltage Vpd stabilizes to different values depending on whether the voltage Vpd is smaller than the reference voltage Vref or the voltage Vpd is greater than or equal to the reference voltage Vref.

Figure 3C:
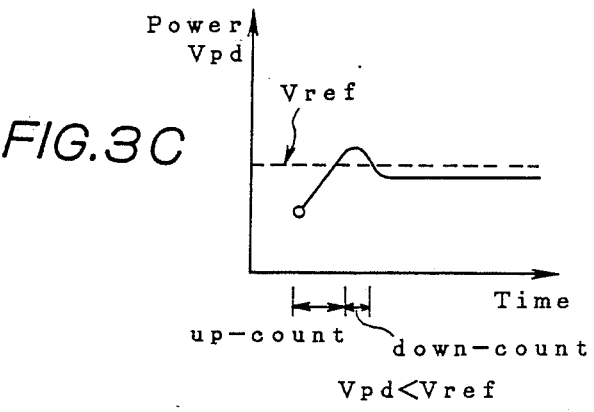
Figure 4:
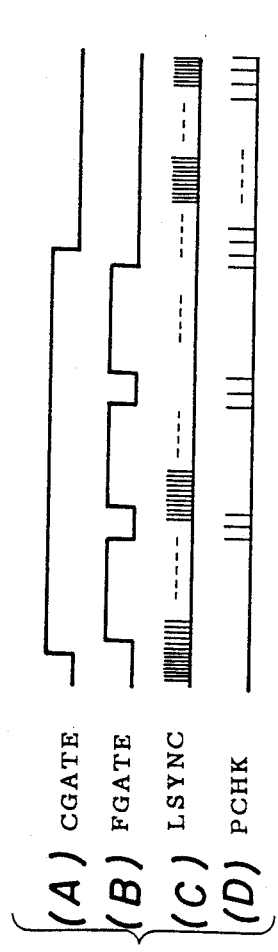
FIGS. 4(A) through 4(D) are timing charts for explaining a resetting of an edge detecting circuit shown in FIG. 2.

Hence, when the output signal of the comparator 12 is inverted from the low level to the high level, the up-down counter 17 operates as a down-counter responsive to a high-level signal from the flip-flop 13. In this state, the output signal of the NOR circuit 15 remains at the low level and the flip-flop 16 is not reset so that the counting operation of the up-down counter 17 remains enabled. In other words, the counting operation of the up-down counter 17 is not prohibited when the laser power of the semiconductor laser 1 increases and the voltage Vpd exceeds the reference voltage Vref, but the counting operation of the up-down counter 17 is prohibited when the laser power of the semiconductor laser 1 decreases and the voltage Vpd exceeds the reference voltage Vref. Accordingly, the current of the semiconductor laser 1 is always constant. As a result, the counting operation of the up-down counter 17 is stopped when the output signal of the comparator 12 is inverted from the low level to the high level and is then inverted from the high level to the low level, and the voltage Vpd is held to a value slightly lower than the reference voltage Vref as shown in FIG. 3C.

On the other hand, contrary to the above, it is possible to always keep the current of the semiconductor laser 1 constant by not prohibiting the counting operation of the up-down counter 17 when the laser power of the semiconductor laser 1 decreases and the voltage Vpd exceeds the reference voltage Vref and prohibiting the counting operation of the up-down counter 17 when the laser power of the semiconductor laser 1 increases and the voltage Vpd exceeds the reference voltage Vref. In either case, the laser power of the semiconductor laser 1 is held to such a value that the voltage Vpd is slightly lower than the reference voltage Vref as shown in FIG. 3A or slightly higher than the reference voltage Vref as shown in FIG. 3B, and the optical output is always kept constant. In other words, the current supplied to the semiconductor laser 1 is always kept constant.

The flip-flops 13, 14 and 16, and the NOR circuit 15 constitute an edge detector 20. The edge detector 20 detects a change in the output signal of the comparator 12 and enables or prohibits the counting operation of the up-down counter 17.

The control circuit 10 controls the optical output of the semiconductor laser 1 so that the output voltage Vpd of the amplifier 11 becomes a constant value with reference to the reference voltage Vref, and the optical output is always held to a constant value.

If the timing signal PCHK were a clock signal always having a constant pulse interval and this clock signal is used to start the power check, the laser beam may reach the surface of the photosensitive body 5 and deteriorate a surface portion of the photosensitive body 5. Hence, this embodiment takes measures so that such a deterioration of the surface portion of the photosensitive body 5 will not occur.

Next, a description will be given of a case where an image formation is successively carried out for three pages, for example. FIGS. 4(A) through 4(D) respectively show signals CGATE, FGATE, LSYNC and PCHK related to the image formation. The signal CGATE indicates a copy operation time in which the photosensitive body 5 rotates, that is, a time it takes until a next copying operation is possible after a start button (not shown) is pushed in the case of a copying machine. The signal FGATE indicates an image output region of a specific size, and the signal LSYNC is the line synchronizing signal outputted from the second photodetector 9. The timing signal PCHK is used as a power check start signal for resetting the edge detector 20. In the case shown in FIGS. 4(A) through 4(D), the power check is carried out even when the photosensitive body 5 is stationary. This means that the laser beam is constantly irradiated on the photosensitive body 5 at a certain line. When this irradiation of the laser beam on the certain line continues for a long period of time, a deterioration occurs at the irradiated portion of the photosensitive body 5.

Figure 6:
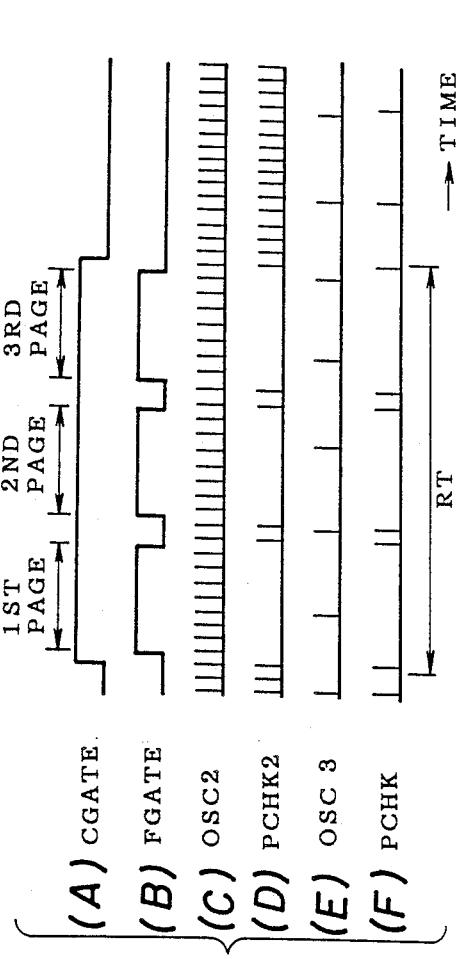
FIGS. 6(A) through 6(F) are timing charts for explaining an operation of the timer shown in FIG. 5.
Figure 5:
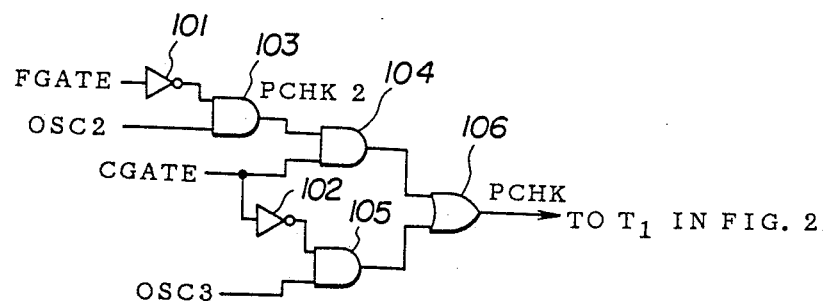
FIG. 5 is a circuit diagram showing an embodiment of a timer.

For this reason, in this embodiment, a timer shown in FIG. 5 is used to generate the timing signal PCHK so as to prevent such a deterioration from occurring on the photosensitive body 5. The timer shown in FIG. 5 has inverters 101 and 102, AND circuits 103 through 105 and an OR circuit 106. A signal CGATE shown in FIG. 6(A) which indicates a rotating time RT of the photosensitive body 5 is supplied to the inverter 102 and the AND circuit 104. For example, the signal CGATE is generated based on the set number of successive copies to be made. A signal FGATE shown in FIG. 6(B) which indicates the image output region in the sub scanning direction of the photosensitive body 5 is supplied to the inverter 101 and a signal OSC2 shown in FIG. 6(C) generated from a second oscillator (not shown) is supplied to the AND circuit 103. For example, the signal FGATE is determined by the detected size of the sheet of paper and the timing with which the sheets of paper are fed. An output signal PCHK2 of the AND circuit 103 shown in FIG. 6(D) is supplied to the AND circuit 104. Hence, a high-level signal portion of the signal OSC2 is outputted from the AND circuit 103 outside the image output region, and the signal PCHK2 during the rotating time RT of the photosensitive body 5 is outputted from the AND circuit 104. In addition, a signal OSC3 shown in FIG. 6(E) generated from a third oscillator (not shown) is supplied to the AND circuit 105 which is also supplied with an output signal of the inverter 102. Hence, the OR circuit 106 receives output signals of the AND circuits 104 and 105 and outputs a timing signal PCHK shown in FIG. 6(F). This timing signal PCHK corresponds to a high-level signal portion of the signal OSC3 during a time when the photosensitive body 5 is stationary. The timing signal PCHK is applied to the terminal T1 shown in FIG. 2.

When the period of the output signal OSC1 of the first oscillator 18 is set smaller than the period of the output signal OSC2 of the second oscillator and the period of the signal OSC2 is set smaller than the period of the output signal OSC3 of the third oscillator, the pulse interval of the timing signal PCHK during the write operation when the photosensitive body 5 rotates becomes shorter than that when the photosensitive body 5 is stationary. For this reason, it is possible to shorten the time in which the laser beam is irradiated on the stationary photosensitive body 5.

When successively carrying out the image formation, the power check is also made between two successive image formation times, that is, between the image formation time of the first page and the image formation time of the second page, for example. This measure is taken because the laser power may vary when a large quantity of images are successively formed and the semiconductor laser 1 is repeatedly turned ON and OFF for a long period of time.

The signal CGATE may be generated by supervising the rotating state of the photosensitive body 5, that is, whether the photosensitive body 5 is rotating or is stationary. Alternatively, it is possible to generate the signal CGATE by reading a driving signal which drives a motor (not shown) for rotating the photosensitive body 5, and in the case of a copying machine, the signal CGATE may be generated by detecting a state of a start button (not shown) which instructs a start of a copying operation.

By use of the timing signal PCHK shown in FIG. 6(F), it is possible to make the power check interval while the photosensitive body 5 is stationary longer than the power check interval in the no-image region while the photosensitive body 5 rotates.

It is possible to make the power check interval while the photosensitive body 5 is stationary infinitely large. In other words, it is possible to actually not carry out the power check while the photosensitive body 5 is stationary.

Figure 7:
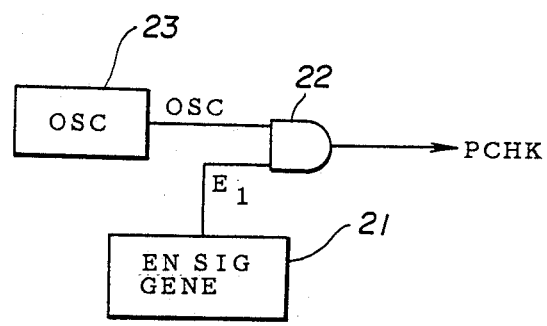
FIG. 7 is a system block diagram showing another embodiment of the timer.

When not carrying out the power check in the waiting mode in which the photosensitive drum 5 is stationary, it is possible to use a timer shown in FIG. 7 to generate the timing signal PCHK which is applied to the terminal T1 shown in FIG. 2. The timer shown in FIG. 7 has an oscillator 23, a power check enable signal generator 21 and an AND circuit 22. The AND circuit 22 is supplied with an output signal OSC shown in FIG. 7(A) of the oscillator 23 and a power check enable signal El shown in FIG. 7(B) generated from the power check enable signal generator 21. Hence, the AND circuit 22 outputs a timing signal PCHK shown in FIG. 7(C), and this timing signal PCHK is supplied to the terminal T1 shown in FIG. 2. When the power check enable signal El has a high level to enable the power check, the timing signal PCHK is obtained from the AND circuit 22 with the oscillation period of the oscillator 23. The oscillation period of the oscillator 23 is determined by the required frequency of the power check, and for example, several tens of seconds is sufficient as the oscillation period.

Figure 9:
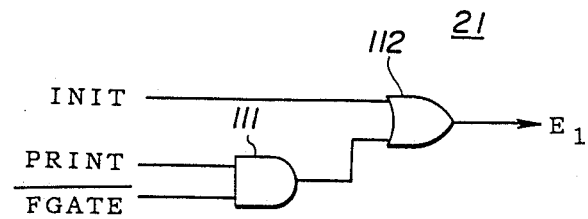
FIG. 9 is a circuit diagram showing an embodiment of a power check enable signal generating circuit shown in FIG. 7.

FIG. 9 shows an embodiment of the power check enable signal generator 21. The power check enable signal generator 21 shown in FIG. 9 has an AND circuit 111 and an OR circuit 112. A print signal PRINT shown in FIG. 10(B) and a signal $\overline{\text{FGATE}}$ shown in FIG. 10(C) are supplied to the AND circuit 111. The signal PRINT is basically the same as the signal CGATE described before indicating the copy operation time in that the signal PRINT indicates the print operation time. An output signal of the AND circuit 111 is supplied to the OR circuit 112 which is also supplied with a signal INIT shown in FIG. 10(A). Hence, a power check enable signal El shown in FIG. 10(D) is outputted from the OR circuit 112 and is supplied to the AND circuit 22 shown in FIG. 7.

The signal INIT has a high level for a predetermined time immediately after a power source (not shown) is turned ON and thereafter has a low level in order to provide an interval in which the power check is enabled so as to stabilize the optical output of the semiconductor 1 from zero to a set value. This interval in which the power check is carried out needs to be long compared to an interval in which the power check is carried out to correct a minute change in the optical output of the semiconductor laser 1 after the optical output is once set to a value close to the set value. Hence, it is advantageous to carry out the above described power check as an initializing operation.

The signal INIT may be generated by a timer (not shown) or use a signal related to a warm-up operation of the image forming apparatus as the signal INIT. For example, the signal processing circuit 7 or the laser driving circuit 8 shown in FIG. 1 may supervise the state of the power source and generate the signal INIT responsive to the ON state of the power source.

For example, in the case where the image forming apparatus is a printer, the signal PRINT indicates that the printer is carrying out a print operation. For example, an output signal of an encoder (not shown) of the motor which drives the photosensitive body 5 or a signal which is used to turn the motor ON and OFF may be used as the signal PRINT.

The signal $\overline{\text{FGATE}}$ which indicates the image output region has a low level in the image region, and the power check is prohibited during the low-level period of the signal $\overline{\text{FGATE}}$. Hence, the AND circuit 111 outputs a high-level power check enable signal El during the image forming operation only outside the image region so as to enable the power check. In other words, in the waiting mode in which the image output is stopped, the power check is normally prohibited except for a short time after the power source is turned ON.

In the case where the image forming apparatus is a printer, the waiting mode includes a time interval from a time when the discharging of the photosensitive body 5, the steady-state rotation of a motor (not shown) for rotating the polygonal mirror 3 and the temperature of a fixing unit (not shown) immediately after the power source is turned ON are respectively set up to initial states to a time when a print start signal is received by the printer in an input waiting state, and a time in which the printer is in an input waiting state to receive the print start signal excluding the time in which the printing operation is carried out.

It is possible to provide a timing control means (not shown) for controlling the timing signal PCHK so that the power check of the semiconductor laser 1, that is, the output control operation, is started with a timing only immediately before the signal FGATE which indicates the effective image region (one frame=one page). Although no illustration and description will be given of such a timing control means, it is possible to use as the signals PCHK and FGATE a signal for driving rollers (not shown) which feed the sheets of paper and a resist timing signal. Any means for outputting such signals may be used as the timing control means.

Figure 11:
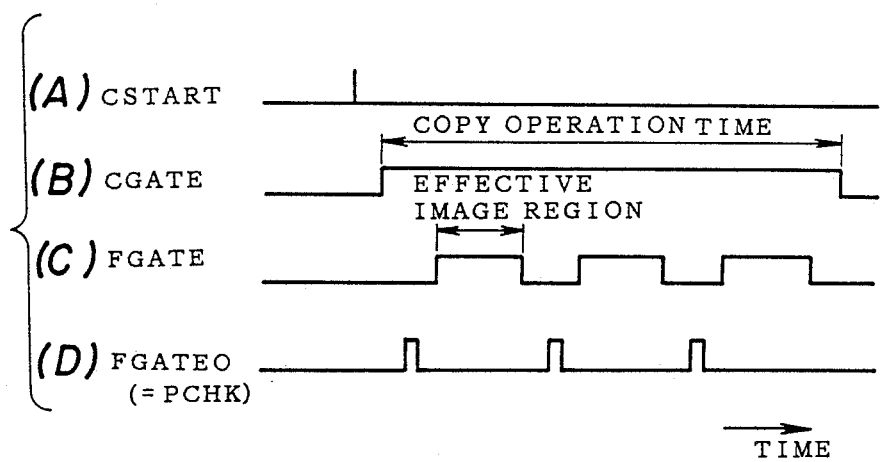
FIGS. 11(A) through 11(D) are time charts for explaining an operation of a second embodiment of the image forming apparatus according to the present invention.
Figure 12:
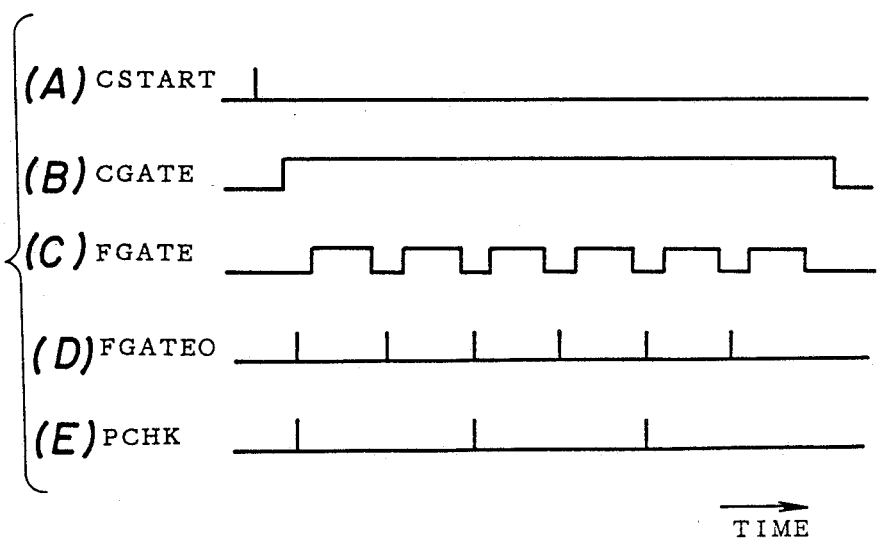
FIGS. 12(A) through 12(E) are time charts for explaining an operation of a third embodiment of the image forming apparatus according to the present invention.

FIGS. 11(A) through 11(D) are timing charts for explaining an operation of a second embodiment of the image forming apparatus according to the present invention. The construction of the image forming apparatus may be the same as that shown in FIG. 1. A description will be given of a case where three copies are successively made on the image forming apparatus which is a copying machine, for example. When a copy button (not shown) is pushed and a copy start signal CSTART shown in FIG. 11(A) is outputted, a signal CGATE shown in FIG. 11(B) is outputted in the operating mode so as to indicate the copy operation mode. Various systems of the printer are started responsive to the signal CGATE. Hence, a number of sheets of paper in accordance with the number of copies to be made are fed, and a signal FGATE shown in FIG. 11(C) is outputted to indicate the effective image region by predicting or detecting that the sheet of paper has reached a predetermined position. The information signal INFO received by the signal processing circuit 7 is outputted while the signal FGATE is outputted so as to drive the semiconductor laser 1 and form the image on the photosensitive body 5. A write optical system discriminates whether or not to carry out the image formation of the next page depending on whether or not the signal FGATE continues to be outputted. In this case, three copies are made, and the signal FGATE is outputted three times during the copying mode.

Prior to each generation of the signal FGATE, it is desirable that the signal FGATE0 is generated as the timing signal PCHK with a timing immediately before the generation of the signal FGATE and the power check is started with this timing to detect, compare and control the output of the semiconductor laser 1. The timing immediately before the generation of the signal FGATE means that there is a sufficiently long time margin to enable completion of the power check between the generation of the signal FGATE0 and the generation of the signal FGATE.

By carrying out the power check with the timing immediately before the signal FGATE, it is possible to set the number of times the power check is carried out to a small number and prevent the unwanted deterioration from occurring on the photosensitive body 5. The power check will not be carried out when the photosensitive body 5 is stationary especially when the image forming apparatus is in the waiting mode. The power check is carried out during the operating mode (copy operation time) when at least the photosensitive body 5 is rotating, and no deterioration occurs at a specific portion of the photosensitive body 5. In addition, since the power check is carried out immediately before the effective image region, it is possible to control the output of the semiconductor laser 1 so that no inconsistency is introduced in the picture quality of the copied pages, and the reproducibility of the image is extremely satisfactory. Especially when this embodiment is compared with the conventional power check which is carried out for every main scanning line, this embodiment can carry out the detection and control of the output of the semiconductor laser 1 with a sufficiently high accuracy even when the high-speed image formation is taken into consideration because the power check is carried out within an interval which is between the signals FGATE and completely unrelated to the image.

FIGS. 12(A) through 12(E) are timing charts for explaining an operation of a third embodiment of the image forming apparatus according to the present invention. The construction of the image forming apparatus may be the same as that shown in FIG. 1. In the second embodiment described before, the signal FGATE0 is generated as the timing signal PCHK before each generation of the signal FGATE. However, in this third embodiment, the signal FGATE0 is generated before the generation of the signal FGATE but not necessarily before each generation of the signal FGATE, and the power check is carried out periodically. In other words, the signal FGATE0 is not used as the timing signal PCHK, and the timing signal PCHK is generated immediately before the first signal FGATE after the image forming apparatus is set to the operating mode and the timing signal PCHK is thereafter generated once for every predetermined number of the signals FGATE0.

In FIGS. 12(A) through 12(E) respectively show the signals CSTART, CGATE, FGATE, FGATE0 and PCHK for the case where the image forming apparatus is a copying machine. First, the power check is always carried out from the rising edge of the signal CGATE which indicates the copy operation time to the first signal FGATE0. But after the operation of the copying machine has started, it is not essential that the power check is carried out before each signal FGATE, and the frequency of the power check may be reduced depending on the stability accuracy required of the laser power. FIGS. 12(A) through 12(E) show the case where the timing signal PCHK is generated once for every two signals FGATE0. In this case, the possibility of the photosensitive body 5 becoming deteriorated is reduced because of the reduced number of times the power check is carried out.

FIG. 13(A) through 13(F) are timing charts for explaining an operation of a fourth embodiment of the image forming apparatus according to the present invention. The construction of the image forming apparatus may be the same as that shown in FIG. 1. FIGS. 13(A) through 13(F) respectively show signals CSTART, CGATE, FGATE0, FGATE, PCEN and PCHK. When the copy start signal CSTART shown in FIG. 13(A) is obtained, the signal CGATE shown in FIG. 13(B) which indicates the copy operation time is outputted to start driving various driving systems of the image forming apparatus. In other words, the signal CGATE is outputted during the operating mode. The sheets of paper on which the image is formed are fed depending on the number of copies to be made in the case where the image forming apparatus is a copying machine, and the signal FGATE indicating the image output region is outputted by predicting or detecting that the sheet of paper has reached a predetermined position. The information signal INFO received by the signal processing circuit 7 is outputted while the signal FGATE is outputted so as to drive the semiconductor laser 1 and form the image on the photosensitive body 5. The write optical system discriminates whether or not to carry out the image formation of the next page depending on whether or not the signal FGATE continues to be outputted. In this case, four copies are made, and the signal FGATE is outputted four times during the copying mode. The signal FGATE0 shown in FIG. 13(C) is generated prior to the signal FGATE shown in FIG. 13(D) and is used as the timing signal PCHK for starting the power check.

The timing with which the signal FGATE0 is generated is immediately before the generation of the signal FGATE, and it is necessary that a time t from the generation of the signal FGATE0 to the generation of the signal FGATE is such that the power check is completed within the time t. For example, it is possible to use as the signal FGATE0 the signal for driving the rollers which feed the sheets of paper and the resist timing signal.

The power check enable signal PCEN shown in FIG. 13(E) is checked when the signal FGATE0 is generated. When the timing signal (power check start signal) PCHK shown in FIG. 13(F) is generated during a high-level period of the power check enable signal PCEN, the power check is carried out. The details of the power check are as described above.

When the signal FGATE0 is generated but the power check enable signal PCEN has a low level, no timing signal PCHK is generated and no power check is carried out. In other words, the optical output of the semiconductor laser 1 need not be checked frequently because the variation in the optical output is caused by a temperature rise within the image forming apparatus during repeated image formations and a change in the ambient temperature. The power check only needs to be carried out prior to the image formation when a predetermined time has elapsed from the previous power check.

FIG. 14 shows an embodiment of a timing signal generating circuit of the fourth embodiment. The timing signal generating circuit has an AND circuit 121, an inverter 122, a timer 123, a resistor R and a capacitor C which are connected as shown. Vcc denotes a power source voltage. The timer 123 is self-triggered and a high-level signal is outputted from a terminal OUT of the timer 123. Hence, a low-level power check enable signal PCEN is outputted from the inverter 122 and is supplied to the AND circuit 121 which is also supplied with the signal FGATE0. In this state, the power check enable signal PCEN indicates a power check prohibit state, and no timing signal PCHK is generated even when the signal FGATE0 is generated because the signal FGATE0 is blocked by the AND circuit 121. When a predetermined time (power check prohibit time) $T_{dis}$ determined by a time constant CR elapses, the signal from the terminal OUT of the timer 123 returns to the low level thereby making the level of the power check enable signal PCEN high. The AND circuit 121 passes the signal FGATE0 during the high-level period of the power check enable signal PCEN, and the timing signal PCHK is generated. Hence, the means for generating the timing signal PCHK can be realized by the timing signal generating circuit having a simple circuit construction.

In the second through fourth embodiments, the period of the timing signal PCHK is fixed. However, the power check may be carried out with the timing immediately before the signal FGATE which indicates the effective image region (1 frame =1 page) in the sub scanning direction of the photosensitive body 5 but with the period of the timing signal PCHK made variable, as is done in the case of a fifth embodiment of the image forming apparatus according to the present invention described hereunder.

Figure 15:
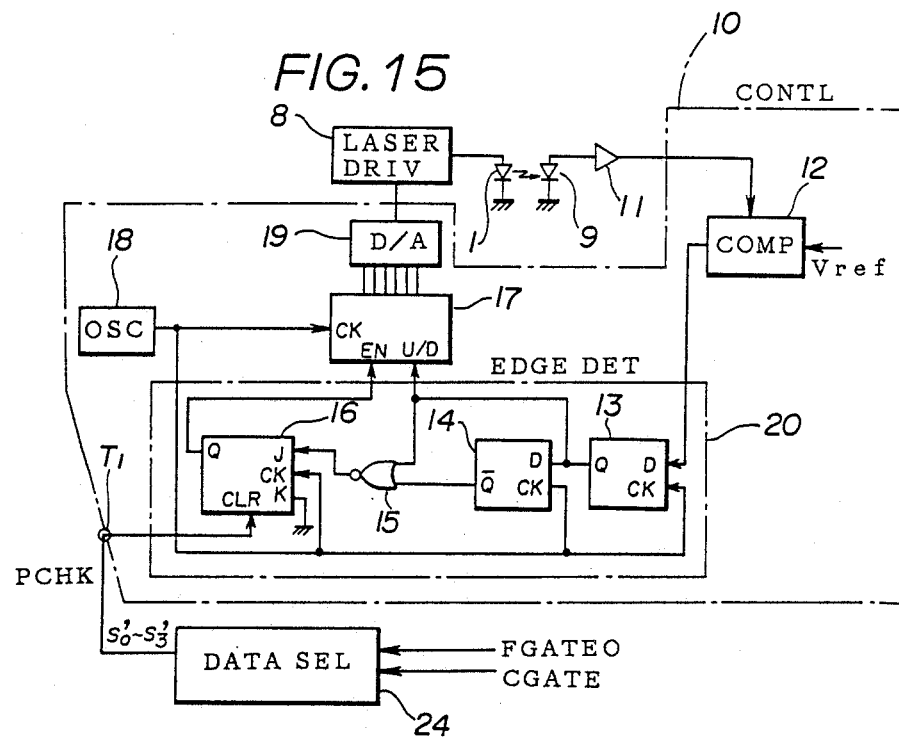
FIG. 15 is a system block diagram showing an embodiment of a control device of a fifth embodiment of the image forming apparatus according to the present invention.

FIG. 15 shows an embodiment of a control device of the fifth embodiment of the image forming apparatus according to the present invention, and FIGS. 16(A) through 16(G) are timing charts for explaining an operation of the fifth embodiment for the case where successive image formations are carried out The construction of the image forming apparatus may be the same as that shown in FIG. 1. In FIG. 15, those parts which are the same as those corresponding parts in FIG. 2 are designated by the same reference numerals, and a description thereof will be omitted.

In FIG. 15, a data select circuit 24 is provided to supply the timing signal PCHK to the clear terminal CLR of the flip-flop 16 within the edge detector 20, where the period of the timing signal PCHK is variable. For example, the driving signal for driving the rollers which feed the sheets of paper, the resist timing signal or the like generated prior to the generation of the signal FGATE is used as the signal FGATE0 and is supplied to the data select circuit 24. Based on the signal FGATE0, the data select circuit 24 outputs one of four kinds of signals S'0 through S'3 which will be described later as the timing signal PCHK. These four kinds of signals S'0 through S'3 have mutually different periods (or frequencies).

Figure 16:
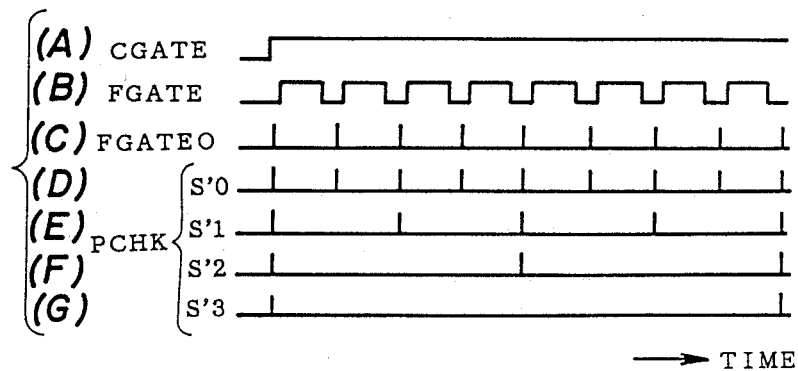
FIGS. 16(A) through 16(G) are timing charts for explaining an operation of the fifth embodiment.

FIGS. 16(A) through 16(C) respectively show the signals CGATE, FGATE and FGATE0. FIGS. 16(D) through 16(G) respectively show the signals S'0 through S'3 The signal S'0 is generated every time the signal FGATE0 is generated. The signal S'1 is generated once every time the signal FGATE0 is generated twice. The signal S'2 is generated once every time the signal FGATE0 is generated four times, and the signal S'3 is generated once every time the signal FGATE0 is generated eight times.

In the case where the image forming apparatus is a copying machine, the signal CGATE shown in FIG. 16(A) which indicates the copy operation time is outputted in the operation mode when the copy button is pushed and the copy start signal is received. Various driving systems of the copying machine are actually started responsive to the signal CGATE. Accordingly, the sheets of paper are fed depending in the number of copies to be made, and the signal FGATE shown in FIG. 16(B) which indicates the effective image region is outputted by predicting or detecting that the sheet of paper has reached a predetermined position. The high-level period of the signal FGATE indicates the effective image region. The information signal INFO received by the signal processing circuit 7 is outputted while the signal FGATE is outputted, and the semiconductor laser 1 is driven to form the image on the photosensitive body 5. Whether or not to copy the next page is discriminated in the write optical system based on whether or not the signal FGATE continues to be outputted.

Prior to the generation of each signal FGATE, the signal FGATE0 shown in FIG. 16(C) is generated with a timing immediately before the signal FGATE and is supplied to the data select circuit 24. The data selecting circuit 24 generates the signals S'0 through S'3 shown in FIGS. 16(D) through 16(G), and one of the signals S'0 through S'3 is selectively outputted at the timing signal PCHK responsive to the signal FGATE0 so that the timing signal PCHK has a preset period. Hence, the power check including the detection, comparison and control of the output of the semiconductor laser 1 is started with the timing of this timing signal PCHK outputted from the data select circuit 24.

For example, when the signal S'0 is selectively outputted from the data select circuit 24 as the timing signal PCHK, the power check is carried out every time the signal FGATE is generated. When the data select circuit 24 selectively outputs the signal S'1 is the timing signal PCHK, the power check is carried out once every time the signal FGATE is generated twice, that is, the power check is carried out once for every two pages. Similarly, the power check is carried out once every time the signal FGATE is generated four times when the signal S'2 is outputted as the timing signal PCHK, and the power check is carried out once every time the signal FGATE is generated eight times when the signal S'3 is outputted at the timing signal PCHK. In any case, the timing immediately before the generation of the signal FGATE means that there is a sufficient time margin so that the power check is completed from the time the when one of the signals S'0 through S'3 is outputted and the time when the signal FGATE is outputted.

Because the power check is carried out with the timing immediately before the generation of the signal FGATE, the power check will not be carried out in the waiting mode or the like in which the photosensitive body 5 is stationary. The power check is carried out when the write operation is actually carried our, that is, in the copy operation time, in a state where at least the photosensitive body 5 is rotating. Thus, there is no deterioration of a specific portion of the photosensitive body 5. In addition, since the power check is carried out immediately before the effective image region, it is possible to control the output of the semiconductor laser 1 so that no inconsistency is introduced in the picture quality of the copied pages, and the reproducibility of the image is extremely satisfactory. Especially when this embodiment is compared with the conventional power check which is carried out for every main scanning line, this embodiment can carry out the detection and control of the output of the semiconductor laser 1 with a sufficiently high accuracy even when the high-speed image formation is taken into consideration because the power check is carried out within an interval which is between the signals FGATE and completely unrelated to the image.

Furthermore, although the power check is always carried out with the timing between the rising edge of the signal CGATE and the signal FGATE0 which is generated first, it is not essential that the power check is carried out before each signal FGATE after the operation of the image forming apparatus has actually started. In other words, the frequency of the power check may be reduced depending on the stability accuracy of the laser power. Thus, in this embodiment, the power check is carried out with a variable period which is selected by the data select circuit 24. As a result, the number of times the power check needs to be carried out is reduced to a minimum and the possibility of the photosensitive body 5 becoming deteriorated is greatly reduced.

Figure 17:
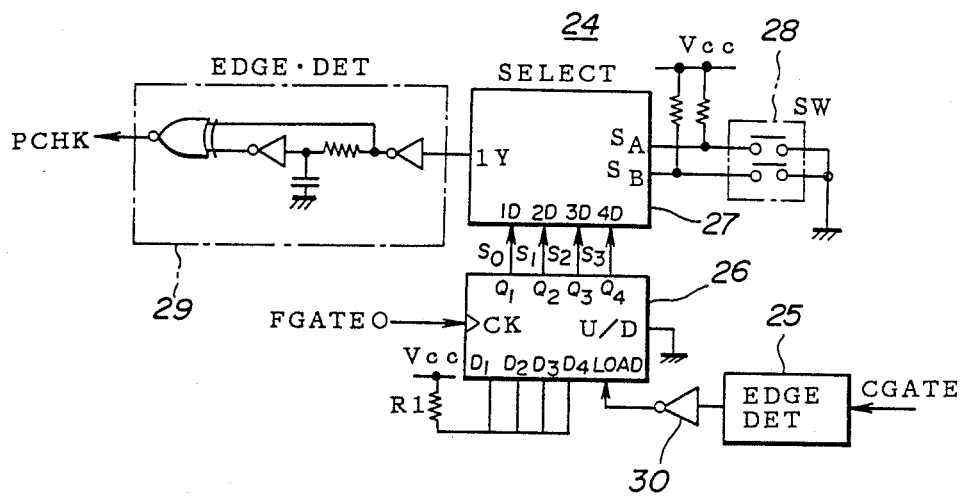
FIG. 17 is a system block diagram showing an embodiment of a data select circuit of the fifth embodiment.

FIG. 17 shows an embodiment of the data select circuit 24, and FIGS. 18(A) through 18(K) are timing charts for explaining the operation of the data select circuit 24 shown in FIG. 17.

Figure 18:
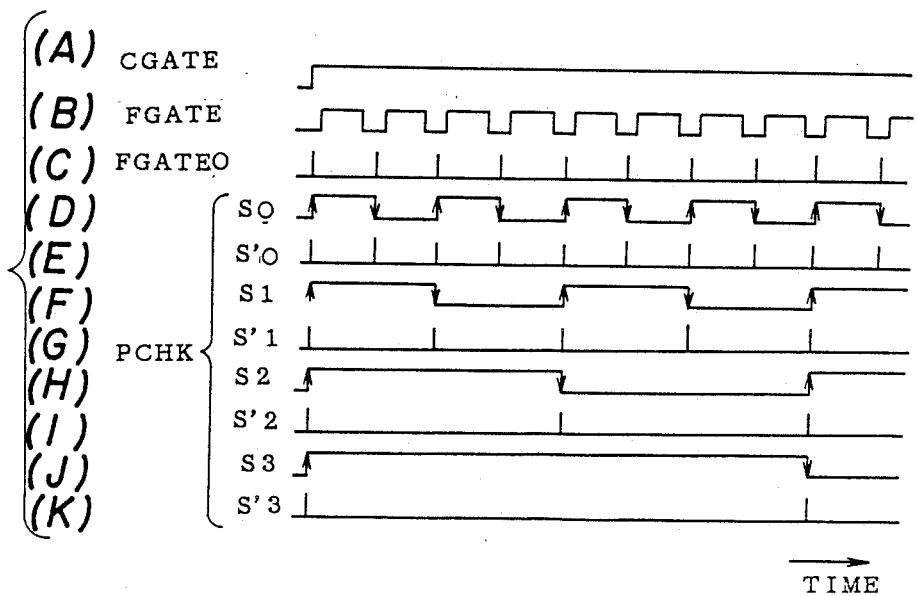
FIGS. 18(A) through 18(K) are timing charts for explaining an operation of the data select circuit shown in FIG. 17.

The data select circuit 24 has an edge detector 25, a counter 26, a selector 27, a digital switch part 28 made up of two digital switches (dip switches), an edge detector 29, and an inverter 30. The signal CGATE shown in FIG. 18(A) is supplied to the edge detector 25 and an output signal of the edge detector 25 is applied to a load terminal LOAD of the counter 26 through the inverter 30. The signal FGATE0 shown in FIG. 18(C) which is generated every time the signal FGATE shown in FIG. 18(B) is generated is applied to a clock terminal CK of the counter 26. A terminal U/D of the counter 26 is grounded so as to fix the counting mode of the counter 26 and use the counter 26 as an up-counter. The counter 26 successively counts up and outputs four kinds of signals S0 through S3 from corresponding terminals Q1 through Q4 thereof responsive to the signal FGATE0 since terminals D1 through D4 are coupled to the power source voltage Vcc through a resistor R1. The signals S0, S1, S2 and S3 are respectively shown in FIGS. 18(D), 18(F), 18(H) and 18(J). These signals S0 through S3 are applied to corresponding terminals 1D through 4D of the selector 27. The selector 27 selectively outputs one of the signals S0 through S3 received at the terminals 1D through 1D depending on a combination of ON/OFF states of the two digital switches constituting the digital switch part 28. The selected one of the signals S0 through S3 is supplied to the edge detector 29 from a terminal 1Y, and a corresponding one of the signals S'0 through S'3 is outputted from the edge detector 29 as the timing signal PCHK. The signals S'0. S'1, S'2 and S'3 are respectively shown in FIGS. 18(E), 18(G), 18(I) and 18(K). For example, when the terminal 3D is selected by outputs of the digital switch part 28 applied to terminals $S_A$ and $S_B$ of the selector 27, the signal S2 is outputted from the selector 27 and the edge detector 29 outputs the corresponding signal S'2 as the timing signal PCHK.

The operation of the data select circuit 24 is started responsive to the signal CGATE and the counter 26 is set to a load mode. Hence, when the signal FGATE0 is applied to the clock terminal CK of the counter 26, the counter 26 outputs the signals S0 through S3 having the timing relationships shown in FIGS. 18(D), 18(F), 18(H) and 18(J). For example, the digital switch part 28 selectes a number out of "0" through "3". The selector 27 selectively outputs one of the signals S0 through S3 having a number corresponding to the number selected by the digital switch part 28. Thus, in the case where the number "1" is selected by the digital switch part 28, the selector 27 selectively outputs the signal S1 received at the terminal 2D. The edge detector 29 detects the rising and falling edges of the signal selectively outputted from the selector 27 and outputs a corresponding one of the signals S'0 through S'3 at predetermined detected edges of the signal received from the selector 27.

In FIG. 17, the selection made in the selector 27 is controlled by the digital switch part 28. However, it is possible to use other external signals to control the selection made in the selector 27.

Figure 19:
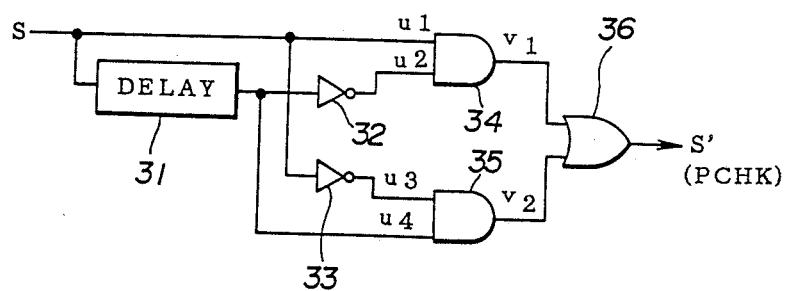
FIG. 19 is a system block diagram showing an embodiment of an edge detector which may be used in place of an edge detector shown in FIG. 17.

FIG. 19 shows an embodiment of an edge detector which may be used in place of the edge detector 29 shown in FIG. 17. In FIG. 19, an edge detector 37 has a delay circuit 31, inverters 32 and 33, AND circuits 34 and 35, and an OR circuit 36 which are connected as shown. An output signal S of the selector 27 shown in FIG. 17 is supplied to the delay circuit 31 and the AND circuit 34.

Figure 20:
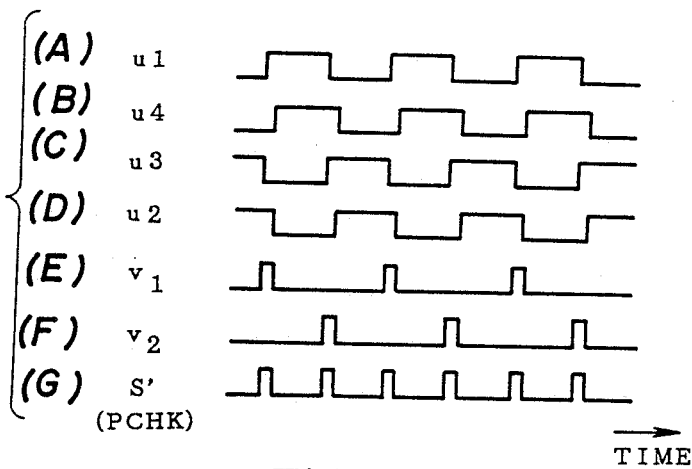
FIGS. 20(A) through 20(G) are timing charts for explaining an operation of the edge detector shown in FIG. 19.

FIG. 20(A) shows a signal u1 which is supplied to one input terminal of the AND circuit 34. This signal u1 corresponds to the output signal S of the selector 27. FIG. 20(B) shows a signal u4 which is supplied to one input terminal of the AND circuit 35 from the delay circuit 31. FIGS. 20(C) and 20(D) respectively show signals u3 and u2 supplied to the other input terminals of the AND circuits 35 and 34 from the respective inverters 33 and 32. FIGS. 20(E) and 20(F) respectively shown signals v1 and v2 outputted from the AND circuits 34 and 35, and FIG. 20(G) shows a signal S' which is outputted from the OR circuit 36 as the timing signal PCHK.

Figure 21:
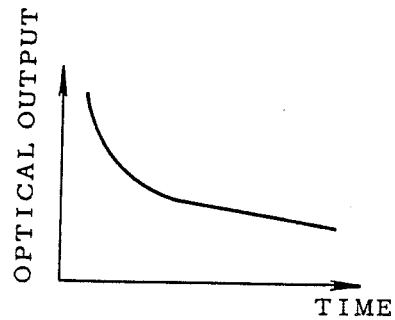
FIG. 21 shows a temperature characteristic of a semiconductor laser used in the present invention.

Next, a description will be given of a sixth embodiment of the image forming apparatus according to the present invention by referring to FIGS. 21 through 23. The construction of the image forming apparatus may be the same as that shown in FIG. 1. In this embodiment, attention is drawn to the temperature of the semiconductor laser 1, and the start of the power check is controlled depending on the temperature change of the semiconductor laser 1.

Generally, the optical output of the semiconductor laser 1 changes with a temperature rise thereof when the semiconductor laser 1 is used for a long period of time. FIG. 21 shows a temperature characteristic of the semiconductor laser 1 used in the present invention. As may be seen from FIG. 21, the change in the optical output of the semiconductor laser 1 is not constant with respect to time, and the output changes gradually after a sudden rise. In other words, the optical output of the semiconductor laser 1 decreases as the temperature rises with respect to the same injection current, because the temperature of the semiconductor laser 1 rises exponentially immediately after the power source is turned ON and the change in the light quantity of the optical output of the semiconductor laser 1 is large with respect to the temperature change. Hence, when attention is drawn to the temperature of the semiconductor laser 1, the power check need not be carried out with the same interval (period) in the initial state where the power source is turned ON and after a long period of time has elapsed from the initial state. It is possible to prevent unnecessary load on the semiconductor laser 1 by carrying out the power check with a long period after the long period of time has elapsed from the initial state.

Figure 22:
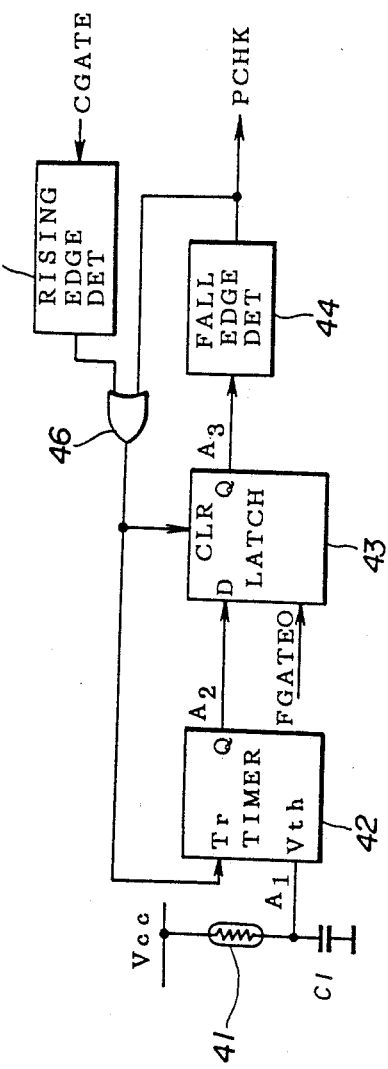
FIG. 22 is a system block diagram showing an embodiment of a timing signal generating circuit of a sixth embodiment of the image forming apparatus according to the present invention.
Figure 23:
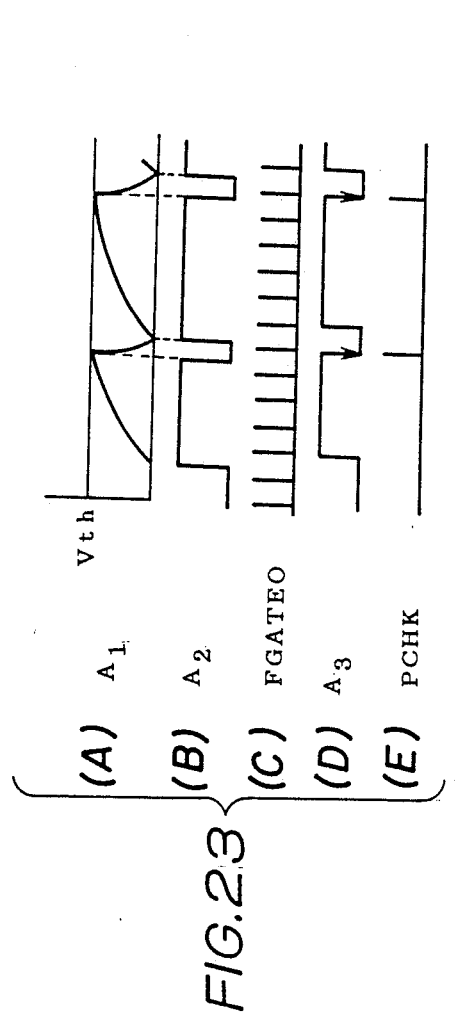
FIGS. 23(A) through 23(E) are timing charts for explaining an operation of the timing signal generating circuit shown in FIG. 22.

FIG. 22 shows an embodiment of a timing signal generating circuit of the sixth embodiment of the image forming apparatus according to the present invention, and FIGS. 23(A) through 23(E) are timing charts for explaining an operation of the timing signal generating circuit shown in FIG. 22.

In FIG. 22, a timing signal generating circuit 40 generally has a thermistor 41, a timer 42, a latch circuit 43, a falling edge detector 44, a rising edge detector 45 and an OR circuit 46. The thermistor 41 is used as a temperature detecting means for detecting the temperature of the semiconductor laser 1. The thermistor 41 monitors the temperature rise of the semiconductor laser 1 and the period of the timing signal PCHK for starting the power check is variably set depending on the detected temperature.

The thermistor 41 is arranged at such a position that the temperature of the semiconductor laser 1, the surrounding temperature and the like having a cause-and-effect relationship with the optical output of the semiconductor laser 1. The thermistor 41 is connected in series with a capacitor C1 to constitute a charge and discharge circuit which is coupled between the power source voltage Vcc and the ground. A voltage A1 at a node between the thermistor 41 and the capacitor C1 is applied to a terminal Vth of the timer 42. The timer 42 has a threshold value Vth, and a signal A2 outputted from a terminal Q of the timer 42 is applied to a terminal D of the latch circuit 43. The signal FGATE0 is applied to a clock terminal of the latch circuit 43. A signal A3 from a terminal Q of the latch circuit 43 is supplied to the falling edge detector 44 which detects the falling edge of the signal A3 and outputs the timing signal PCHK with the timing of the detected falling edges.

Measures are taken so that the entire operation of the timing generating circuit 40 is cleared only during the copying operation (image formation) and every time the timing signal PCHK is outputted. That is, an output signal of the rising edge detector 45 which detects the rising edge of the signal CGATE and the output timing signal PCHK of the falling edge detector 44 are supplied to the OR circuit 46, and an output signal of the OR circuit 46 is applied to a trigger terminal Tr of the timer 42 and a clear terminal CLR of the latch circuit 43. Hence, at timer which outputs a high-level signal A2 responsive to the trigger input and outputs a low-level signal A2 when the threshold value Vth is reached is used as the timer 42.

The resistance of the thermistor 41 changes depending on the surrounding temperature in a vicinity of the semiconductor laser 1, and the time constant of the charge and discharge circuit changes with the temperature thereby changing the charging state of the capacitor C1. In other words, the signal voltage A1 shown in FIG. 23(A) changes depending on the temperature, and the capacitor C1 is discharged when the value of the signal voltage A1 reaches the threshold value Vth. As shown in FIG. 23(A), the signal voltage A1 is restricted to the threshold value Vth and the charge and discharge circuit repeats the charge and discharge, and the signal A2 shown in FIG. 23(B) having a pulse form is outputted from the timer 42. On the other hand, because the latch circuit 43 limits the output timing of the timing signal PCHK to immediately before the output timing of the signal FGATE, the signal A2 is latched for every signal FGATE responsive to the signal FGATE0 shown in FIG. 23(C) which is outputted immediately before the signal FGATE. As a result, the signal A2 is converted into the signal A3 shown in FIG. 23(D) in the latch circuit 43. The falling edge detector 44 detects the falling edge of the signal A3 and generates the timing signal PCHK shown in FIG. 23(E) with the timing of the detected falling edges.

Therefore, in this embodiment, the temperature change of the semiconductor laser 1 is used as an element for determining the period with which the power check is started. The power check is carried out only when necessary and non-periodically, and the number of times the power check needs to be is carried out is automatically set to a minimum value.

Figure 24:
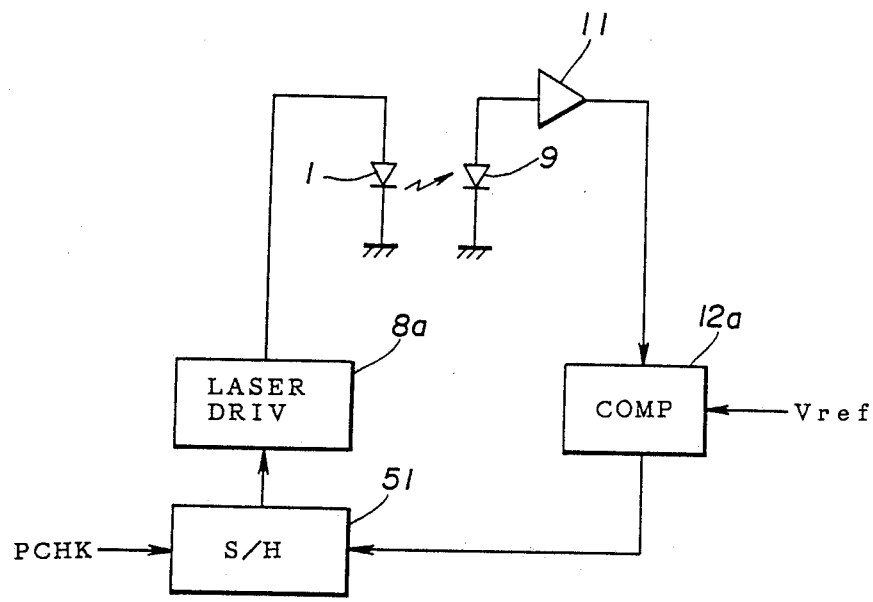
FIG. 24 is a system block diagram showing a modification of the control device.

FIG. 24 shows a modification of the control device using analog circuits. In FIG. 24, those parts which are the same as those corresponding parts in FIG. 2 are designated by the same reference numerals, and a description thereof will be omitted. This embodiment is applicable to the case where the control device is made up solely of analog circuits.

In FIG. 24, the output signal of the photodetector 9 dependent on the intensity of the optical output of the semiconductor laser 1 is amplified in the amplifier 11, and an output voltage of the amplifier 11 is compared with the reference voltage Vref in a comparator 12a. An output error signal of the comparator 12a is supplied to a sample and hold (S/H) circuit 51, and the S/H circuit 51 holds the error signal and supplies a signal to a laser driving circuit 8a when the start of the power check is instructed by the external timing signal PCHK. The laser driving circuit 8a adjusts the current applied to the semiconductor laser 1 depending on the output signal of the S/H circuit 51 so as to maintain the intensity of the optical output of the semiconductor laser 1 constant. A timing signal in accordance with the present invention is used as the external timing signal PCHK.

Figure 25:
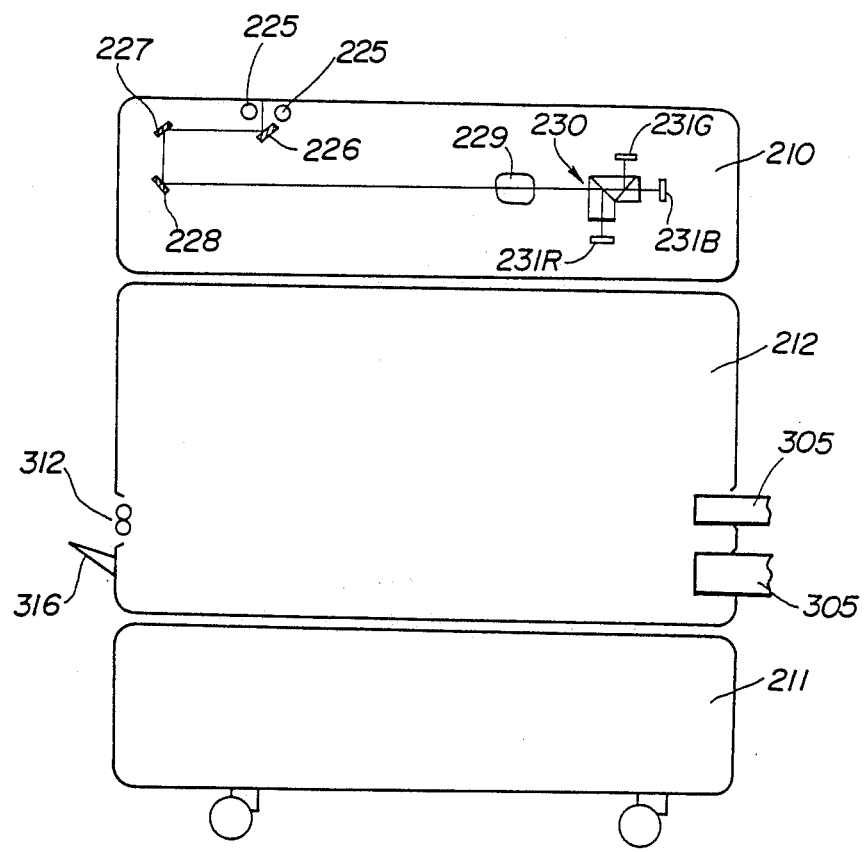
FIG. 25 generally shows a color copying machine which may be applied with the present invention.

FIG. 25 generally shows a color copying machine which may be applied with the present invention. The color copying machine has an image reading part 210, an image processing part 211, and an image output part 212.

In the image reading part 210, a document image such as a picture and/or characters is linearly scanned by a light emitted from a light source 225 and a reflected light is directed to a converging lens 229 through mirrors 226 through 228. The light passing through the converging lens 229 is supplied to a color separation part 230 and is converged on light receiving elements 231R, 231G and 231B which respectively convert the optical image into electrical signals of red (R), green (G) and blue (B). Hence, digital signals R, G and B (data) obtained through the color separation of the document image is outputted from the image reading part 210.

The image processing part 211 processes the digital signals R, G and B into signals of yellow (Y), magenta (M) and cyan (C). In addition, the signals Y, M and C are subjected to further signal processings such as a gamma correction, a color correcting process, a masking process and a dither process for describing the data in gradation levels. The processed data from the image processing part 211 is supplied to the image output part 212.

Figure 26:
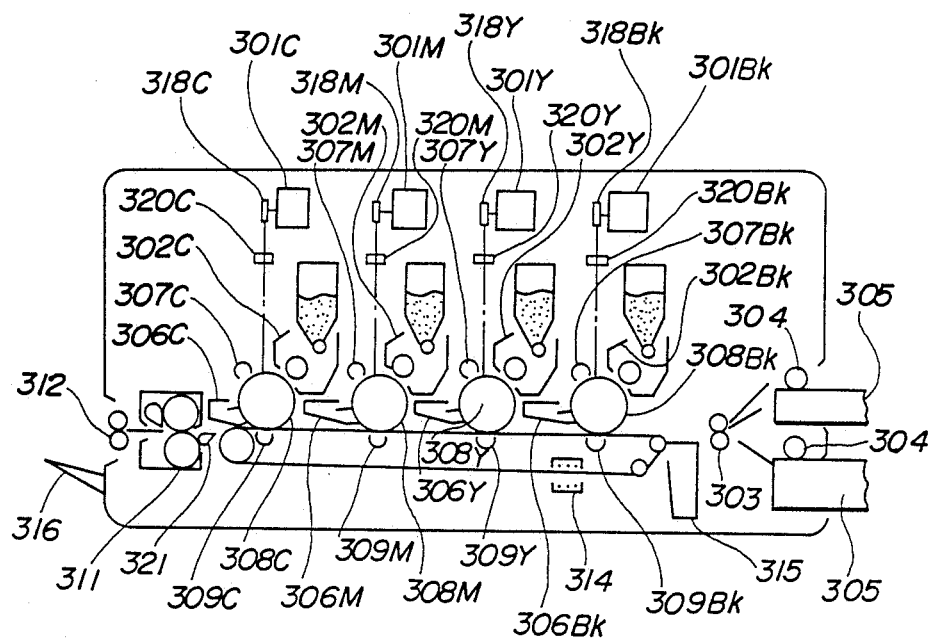
FIGS. 26 and 27 respectively show essential parts of an image output part of the color copying machine shown in FIG. 25.
Figure 27:
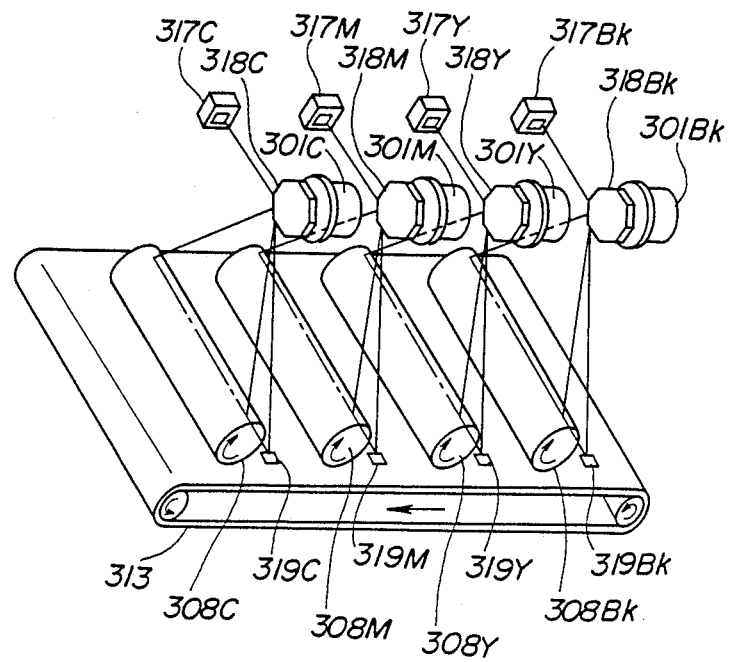

An exposure in the image output part 212 will now be described in conjunction with FIGS. 26 and 27 by taking the exposure of black (Bk) information as an example. A laser light source 317Bk emits a laser beam modulated by the image signal of black, and this laser beam is deflected by a polygonal mirror 318Bk which is rotated by a motor 301Bk. The deflected laser beam passes through an imaging lens 320Bk and scans predetermined position on a photosensitive drum 308Bk. This scanning of the laser beam is called a main scan, and this main scan is made in a main scanning direction. The laser beam repeatedly scans the photosensitive drum 308Bk along a scanning line in the same main scanning direction for each scan due to the rotation of the polygonal mirror 318Bk. But since the photosensitive drum 308Bk rotates in the direction of an arrow, the laser beam also scans the photosensitive drum 308Bk in the direction of the arrow. This scanning of the laser beam is called a sub scan, and this sub scan is made in a sub scanning direction. In other words, the laser beam makes a raster scan on the photosensitive drum 308Bk.

The photosensitive drum 308Bk which is initially charged by a corona discharger 307Bk is scanned by the laser beam depending on the image signal, and the charge at portions of the photosensitive drum 308Bk which receive a predetermined exposure energy is eliminated, thereby forming an electrostatic image on the photosensitive drum 308Bk. The charged black toner is deposited on the exposed portions of the photosensitive drum 308Bk by a developer 302Bk, so as to develop the electrostatic image. The developed image is transferred onto a recording sheet.

The exposure process is similarly carried out for each of the colors of yellow, magenta and cyan, and description thereof will be omitted. In FIGS. 26 and 27, those parts which are essentially the same as those corresponding parts provided for the printing in black are designated by the same reference numerals with subscripts Y, M and C for yellow, magenta and cyan, respectively.

On the other hand, a recording sheet supplied from an arbitrary one of trays 305 by corresponding paper supplying rollers 304 is transported in the direction of an arrow by a transport belt 313. The transport belt 313 is driven by a plurality of rollers. Contact points where the transport belt 313 makes contact with the photosensitive drums 308Bk, 308Y, 308M and 308C correspond to the transfer positions, and the color toners are attracted onto the recording sheet by corresponding transfer dischargers 309Bk, 309Y, 309M and 309C. The recording sheet onto which the color toner images are transferred is separated from the transport belt 313 by a separation claw 321, and passes through a fixing unit 311 using thermal rollers. Hence, the overlapping color toner images on the recording sheet are fixed, and the recording sheet is ejected to a tray 316 by ejecting rollers 312.

Figure 28:
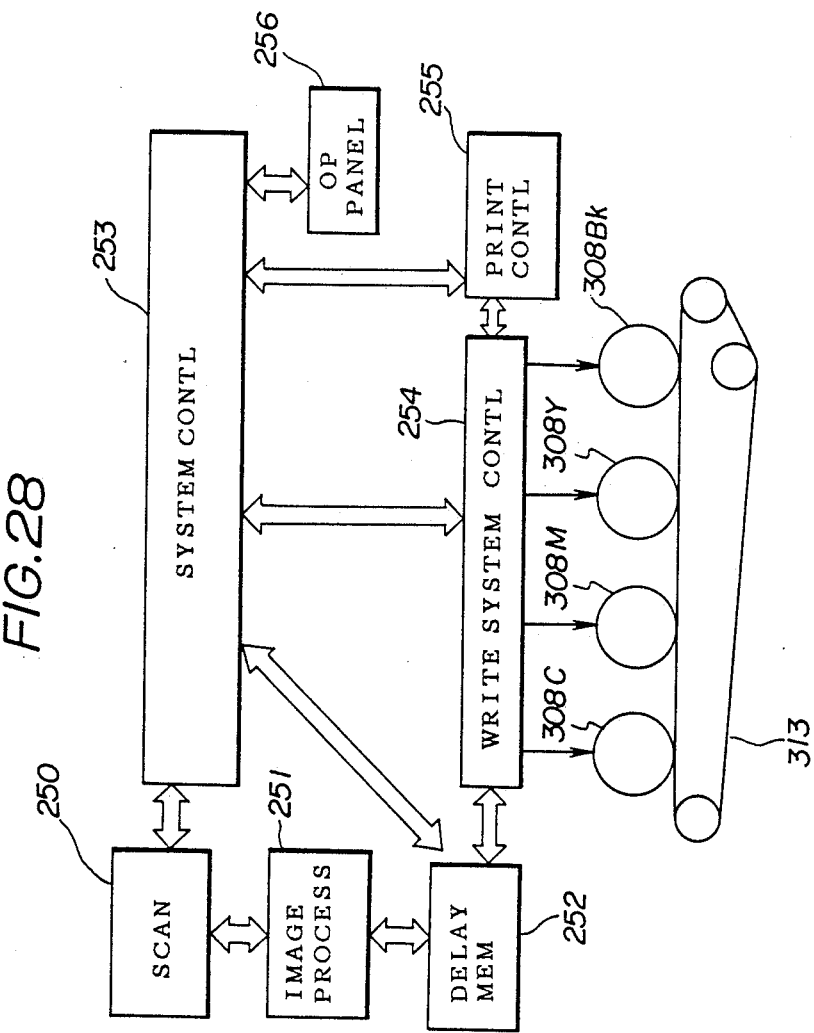
FIG. 28 is a system block diagram showing an essential part of an electrical system of the color copying machine shown in FIG. 25.

FIG. 28 shows an essential part of an electrical system of the color copying machine. The electrical system has a scanner 250, an image processor 251, a delay memory circuit 252, a system controller 253, a write system control circuit 254, a printer control circuit 255, and operation panel 256. The scanner 250 corresponds to the image reading part 210 shown in FIG. 25. The image processor 251 and the delay memory 252 correspond to the image processing part 211 shown in FIG. 25. In FIG. 28, those parts which are the same as those corresponding parts in FIGS. 26 and 27 are designated by the same reference numerals, and a description thereof will be omitted.

The image data obtained by reading the document image in the scanner 250 are subjected to various processings in the image processor 251. The processed image data from the image processor 251 are once stored in the delay memory 252 and are then supplied to the write system control circuit 254 responsive to a data transmission start signal from the system controller 253. The laser beam emitted from the laser light source is modulated based on the image data received by the write system control circuit 254.

The operation panel 256 has an input part for instructing a quality of the print to be made, and includes a copy start button. The printer control circuit 255 controls the operating sequence of the photosensitive drums 318Bk, 318Y, 318M and 318C, that is, the motors for driving the photosensitive drums 318Bk, 318Y, 318M and 318C, for example. The copy start signal CSTART is generated from the printer control circuit 255 by detecting that the copy start button of the operation panel 256 is pushed. In addition, the signals FGATE, CGATE and the like are also generated from the printer control circuit 255 based on the sequential operation of the image output part 212. Furthermore, the power check enable signal PCEN is generated from the printer control circuit 255 depending on the signals FGATE, CGATE and the like.

Figure 29:
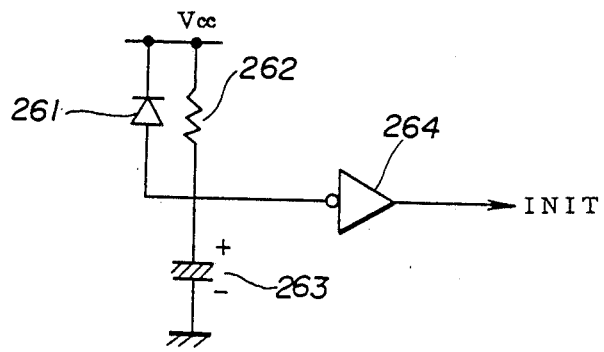
FIG. 29 is a circuit diagram showing an embodiment of an initializing circuit.

The signal INIT may be generated by an initializing circuit shown in FIG. 29. The initializing circuit has a diode 261, a resistor 262, a capacitor 263 and a buffer 264 which are coupled as shown. Vcc denotes a power source voltage. The initializing circuit outputs a high-level signal INIT for a predetermined time immediately after the power source is turned ON and outputs a low-level signal INIT after the predetermined time elapses. This predetermined time is dependent on a time constant which is determined by the resistor 262 and the capacitor 263.

However, it is of course possible to generate the signal INIT from the printer control circuit 255 when the power source is turned ON.

The printer control circuit 255 may be constituted by a microcomputer.

Further, the present invention is not limited to these embodiments, and various variations and modifications may be made without departing from the scope of the present invention.

What is claimed is:

1. An image controlling apparatus comprising:
   a semiconductor laser for emitting a light beam;
   imaging means including a photosensitive body and scanning means for scanning the photosensitive body by a spot of the laser beam on the photosensitive body so as to from an electrostatic image on the photosensitive body, said spot repeatedly scanning said photosensitive body in a main scanning direction along a sub scanning direction, wherein in said sub scanning direction the laser beam scans a margin region followed by an effective image forming region;
   means for generating a first signal and a second signal, wherein the second signal is indicative of the start of the scan of said effective image forming region and the first signal is generated immediately before the second signal and has a predetermined period;
   means for generating a reference value; and
   control means for carrying out a control operation during said predetermined period of said first signal and thus during the scan of said margin region and immediately before the scan of said image forming region, to control a laser power of the laser beam emitted from said semiconductor laser, said control means having detector means for detecting an intensity of the laser beam emitted from said semiconductor laser, comparator means for comparing the intensity of the laser beam detected in said detector means with said reference value and for providing an output responsive to said comparing, and means operative in response to said second signal and to said output of said comparator means for controlling the laser power of the laser beam emitted from said semiconductor laser to maintain said power approximately constant during the scan of said image forming region.

2. An image forming apparatus as claimed in claim 1 in which said signal generating means generates said first signal before each said second signal.

3. An image forming apparatus as claimed in claim 1 in which said signal generating means generates said first signal only after a predetermined time has elapsed from a previous control operation carried out by said control means.

4. An image forming apparatus as claimed in claim 1 in which said signal generating means generates said first signal before selected second signal.

5. An image forming apparatus as claimed in claim 1 in which said signal generating means generates said first signal with said predetermined period which is variable.

6. An image forming apparatus as claimed in claim 5 in which said signal generating means includes setting means for setting a value of said predetermined period.

7. An image forming apparatus as claimed in claim 6 in which said setting means includes first means for generating a plurality of signals having mutually different periods, second means for selecting an arbitrary value for said predetermined period, and third means for selectively outputting as said second signal one of the plurality of signals generated by said first means depending on the arbitrary value selected by said second means.

8. An image forming apparatus as claimed in claim 6 in which said setting means includes detecting means for detecting a temperature of said semiconductor laser, and means for setting said predetermined period to a value dependent on the temperature detected by said detecting means.

9. An image forming apparatus as claimed in claim 6 in which said setting means includes detecting means for detecting a temperature in a vicinity of said semiconductor laser, and means for setting said predetermined period to a value dependent on the temperature detected by said detecting means.

10. An image forming apparatus as claimed in claim 1 in which said photosensitive body is made up of a rotatable photosensitive drum.

11. An image forming apparatus as claimed in claim 10 in which said signal generating means generates said first signal with such a timing that the control operation of said control means is prohibited during a time in which said rotatable photosensitive drum rotates.

12. A method of controlling laser power of a laser beam emitted from a semiconductor laser of an image forming apparatus which comprises imaging means including a photosensitive body and scanning means for scanning the photosensitive body by a spot of the laser beam on the photosensitive body so as to form an electrostatic image on the photosensitive body, said spot repeatedly scanning said photosensitive body in a main scanning direction along a sub scanning direction, said method comprising the steps of:
   detecting an intensity of the laser beam emitted from said semiconductor laser;
   comparing the detected intensity of the laser beam with a reference value; and
   controlling the laser power of the laser beam emitted from said semiconductor laser to maintain said power approximately constant depending on a compared result, said compared result being derived with a timing determined by a first signal which is generated with a predetermined period during the scanning in the sub scanning direction of a margin region of said photosensitive body immediatly before a second signal indicating the scanning of an effective image forming region of the photosensitive body in the sub scanning direction.

13. A method as claimed in claim 12 which further comprises the step of variably setting a value of said predetermined period.

14. A method as claimed in claim 12 which further comprises the step of variably setting a value of said predetermined period depending on a temperature of said semiconductor laser.

15. A method as claimed in claim 12 which further comprises the step of variably setting a value of said predetermined period depending on a temperature in a vicinity of said semiconductor laser.

16. A method as claimed in claim 12 in which said photosensitive body is made up of a rotatable photosensitive drum, said step of controlling the laser power of the laser beam being prohibited during a time in which said rotatable photosensitive drum rotates.

* * * * *